United States Patent
Wittmann et al.

(10) Patent No.: US 12,338,125 B2
(45) Date of Patent: Jun. 24, 2025

(54) METHOD FOR ODOR REDUCTION OF PARTICULATE CARBON MATERIALS

(71) Applicant: SUNCOAL INDUSTRIES GMBH, Ludwigsfelde (DE)

(72) Inventors: Tobias Wittmann, Berlin (DE); Jacob Podschun, Berlin (DE); Gerd Schmaucks, Scheeßel (DE); Ulf Lüder, Teltow (DE)

(73) Assignee: Suncoal Industries GmbH, Ludwigsfelde (DE)

( * ) Notice: Subject to any disclaimer, the term of this patent is extended or adjusted under 35 U.S.C. 154(b) by 835 days.

(21) Appl. No.: 17/432,806

(22) PCT Filed: Feb. 21, 2020

(86) PCT No.: PCT/EP2020/054636
§ 371 (c)(1),
(2) Date: Aug. 20, 2021

(87) PCT Pub. No.: WO2020/169809
PCT Pub. Date: Aug. 27, 2020

(65) Prior Publication Data
US 2022/0135408 A1    May 5, 2022

(30) Foreign Application Priority Data
Feb. 21, 2019 (DE) .................. 10 2019 104 406.5

(51) Int. Cl.
*C01B 32/05* (2017.01)
*C08K 3/04* (2006.01)

(52) U.S. Cl.
CPC ............. *C01B 32/05* (2017.08); *C08K 3/04* (2013.01); *C01P 2006/12* (2013.01)

(58) Field of Classification Search
CPC ........... C01B 32/05; C01B 32/00; C08K 3/04; C01P 2006/12; C01P 2006/90; D21C 11/0007; D21C 11/08; D21H 13/50; C09C 1/44; C09C 3/043; C09C 1/56; C08L 9/06; C08L 101/00; C08B 30/12; C08H 6/00
See application file for complete search history.

(56) References Cited

U.S. PATENT DOCUMENTS

| | | | |
|---|---|---|---|
| 4,477,611 A | 10/1984 | Sperley | |
| 4,598,105 A | 7/1986 | Weber et al. | |
| 5,192,361 A | 3/1993 | Schilling | |
| 6,172,154 B1 | 1/2001 | Brown et al. | |

(Continued)

FOREIGN PATENT DOCUMENTS

| | | |
|---|---|---|
| AT | 85234 B | 11/1921 |
| CA | 622715 A | 3/1956 |

(Continued)

OTHER PUBLICATIONS

Wang, et al., Oxidative torrefaction of biomass residues and densification of torrefied sawdust to pellets, Bioresource Technology 2013; 127: 318-325 (Year: 2013).*

(Continued)

*Primary Examiner* — Daniel C. McCracken
(74) *Attorney, Agent, or Firm* — Servilla Whitney LLC

(57) ABSTRACT

It is provided a method for reducing the odor of particulate carbon materials and to the materials obtained thereby.

12 Claims, 2 Drawing Sheets

(56) References Cited

U.S. PATENT DOCUMENTS

| | | |
|---|---|---|
| 7,064,171 B1 | 6/2006 | Halasa et al. |
| 7,671,126 B1 | 3/2010 | Sandstrom et al. |
| 9,512,376 B2 | 12/2016 | Peus |
| 9,902,816 B2 | 2/2018 | Wittmann et al. |
| 10,611,885 B2 | 4/2020 | Wittmann et al. |
| 11,306,209 B2 | 4/2022 | Wittmann et al. |
| 11,312,864 B2 | 4/2022 | Wittmann et al. |
| 2002/0156177 A1 | 10/2002 | Freund |
| 2005/0100502 A1 | 5/2005 | Krauss et al. |
| 2007/0100058 A1 | 5/2007 | Noguchi et al. |
| 2007/0151178 A1 | 7/2007 | Baikerikar et al. |
| 2007/0187033 A1 | 8/2007 | Shumacher et al. |
| 2007/0193669 A1 | 8/2007 | Giannini et al. |
| 2008/0066839 A1 | 3/2008 | Sandstrom et al. |
| 2009/0099281 A1 | 4/2009 | Sakurai et al. |
| 2010/0130639 A1 | 5/2010 | Viola et al. |
| 2010/0204368 A1 | 8/2010 | Benko et al. |
| 2010/0304141 A1 | 12/2010 | Kamegawa et al. |
| 2011/0236816 A1 | 9/2011 | Stanyschofsky et al. |
| 2012/0302664 A1 | 11/2012 | Kamada |
| 2013/0046064 A1 | 2/2013 | Herd et al. |
| 2013/0256113 A1 | 10/2013 | Tumiatti et al. |
| 2013/0312472 A1 | 11/2013 | Brehmer et al. |
| 2014/0116594 A1 | 5/2014 | Miyazaki |
| 2014/0162873 A1 | 6/2014 | Gu |
| 2014/0227325 A1 | 8/2014 | Naskar et al. |
| 2014/0339467 A1 | 11/2014 | Elliot et al. |
| 2015/0152255 A1 | 6/2015 | Mlayah et al. |
| 2016/0230099 A1 | 8/2016 | Hilli et al. |
| 2017/0058127 A1* | 3/2017 | Naduvile Veettil ...... D21C 1/06 |
| 2017/0226535 A1 | 8/2017 | Tudman |
| 2018/0340074 A1* | 11/2018 | Wittmann ............... C08L 21/00 |

FOREIGN PATENT DOCUMENTS

| | | | |
|---|---|---|---|
| CA | 700368 A | 12/1964 | |
| CA | 818607 A | 7/1969 | |
| CA | 2920702 A1 | 2/2015 | |
| CA | 3002724 A1 | 5/2017 | |
| CN | 102212219 A | 10/2011 | |
| CN | 103951858 A | 7/2014 | |
| CN | 106243427 A | 12/2016 | |
| DE | 102006057566 * | 6/2008 | ............. B27N 1/003 |
| DE | 102006057566 A1 | 6/2008 | |
| DE | 102007056170 A1 | 11/2008 | |
| DE | 2007022840 A1 | 12/2008 | |
| DE | 2008050966 A1 | 5/2009 | |
| DE | 2011113825 A1 | 3/2013 | |
| DE | 102015015549.0 | 11/2015 | |
| DE | 102014215807 B3 | 12/2015 | |
| DE | 102014215627 A1 | 2/2016 | |
| DE | 102016201801.9 | 2/2016 | |
| EP | 1233042 A2 | 8/2002 | |
| EP | 1457308 A1 | 9/2004 | |
| EP | 2130893 A2 | 12/2009 | |
| EP | 2223928 A1 | 9/2010 | |
| EP | 2305750 A1 | 4/2011 | |
| EP | 2479223 A1 | 7/2012 | |
| EP | 2484434 A1 | 8/2012 | |
| EP | 2671632 A2 | 12/2013 | |
| EP | 2937388 A1 | 10/2015 | |
| EP | 2796561 B1 | 7/2016 | |
| EP | 3053929 A1 | 8/2016 | |
| EP | 3059287 A1 | 8/2016 | |
| EP | 2681296 B1 | 4/2018 | |
| JP | 2005075856 A | 3/2005 | |
| JP | 2011006552 A | 1/2011 | |
| KR | 20140102807 A | 8/2014 | |
| RU | 2417172 C2 | 4/2011 | |
| RU | 2442806 C2 | 2/2012 | |
| WO | 2005100502 A1 | 10/2005 | |
| WO | 2008095589 A1 | 8/2008 | |
| WO | 2009127727 A1 | 10/2009 | |
| WO | 2009145784 A1 | 12/2009 | |
| WO | 2010006881 A1 | 1/2010 | |
| WO | 2010043562 A1 | 4/2010 | |
| WO | 2010112230 A1 | 10/2010 | |
| WO | 2011001315 A1 | 1/2011 | |
| WO | 2011013161 A1 | 2/2011 | |
| WO | 2012000033 A1 | 1/2012 | |
| WO | 2012168502 A1 | 12/2012 | |
| WO | 2014016344 A1 | 1/2014 | |
| WO | 2014096544 A1 | 6/2014 | |
| WO | WO 2014/096544 * | 6/2014 | ............... C10L 9/08 |
| WO | 2014122163 A1 | 8/2014 | |
| WO | 2014180753 A1 | 11/2014 | |
| WO | 2015018944 A1 | 2/2015 | |
| WO | 2015025076 A1 | 2/2015 | |
| WO | 2015056757 A1 | 4/2015 | |
| WO | 2015097196 A2 | 7/2015 | |
| WO | 2016001490 A1 | 1/2016 | |
| WO | 2016020383 A1 | 2/2016 | |
| WO | 2016207493 A1 | 12/2016 | |
| WO | WO 2016/207493 * | 12/2016 | ............... C08H 7/00 |
| WO | 2017085278 A1 | 5/2017 | |
| WO | WO 2017/085278 * | 5/2017 | ............... C09C 1/48 |
| WO | 2017109672 A1 | 6/2017 | |
| WO | 2020115143 A1 | 6/2020 | |
| WO | 2020169809 A2 | 8/2020 | |
| WO | 2021005230 A1 | 1/2021 | |
| WO | 2022063841 A1 | 3/2022 | |

OTHER PUBLICATIONS

Machine Translation of DE 102006057566 to Wagenfuehr, et al. (Year: 2008).*
Kang, et al., -Xylose, and Wood Meal, Industrial & Engineering Chemistry Research 2012; 51(26): 9023-9031 (Year: 2012).*
Challenge Tech handmade tires catalogue (published 2015), 2 pages.
Continental Solid Tires catalogue (published 2018), 24 pages.
Michelin X Tweel Airless Radial Tire Family catalogue (published 2018), 8 pages.
Product information Ultrasil 360, Feb. 2018 (Evonik), 2 pages.
"ATSM International "Standard Test Method for Carbon Black—Total and External Surface Area by Nitrogen Adsorption"", Designation: D6556-09, Dec. 15, 2019.
"Dynamic Mechanical Properties of Passenger and Light Truck Tire Treads", NHTSA, Feb. 2010, 28 pages.
"English Translation of International Search Report in PCT/EP2020/054636 dated Dec. 17, 2020, 2 pages".
"English Translation of Written Opinion in PCT/EP2020/054636 dated Dec. 17, 2020, 6 pages".
"How much does a tyre weigh?", (1 Aug. 8, 2015; Author: oponeo. co.uk, Adam Winter; http://www.oponeo.co.uk:80/tyre-article/how-muchdoes-a-tyre-weigh—capture from web.archive.org dated May 5, 2016).
"Hydroisotop GmbH, ,Nachwachsende Rohstoffe, Sekundarbrennstoffe, Apr. 13, 2018".
"Hydrothermal Carbonization—1. Influence of Lignin in Lignocelluloses", Dec. 2011, Chemical Engineering & Technology 34(12) (DOI:10.1002/ceat.201100487).
"IPC vol. 1 Sec B, 8th. ed.", article WIPO, International Patent Classification (core level), 2006 particular relevance: pp. 106-108.
"Lignin Filler for Tires (1957), 5 pages".
"Popular mechanics", 1914, vol. 22, No. 3, p. 402.
"Product information Ultrasil VN 3, Sep. 2018 (Evonik), 2 pages".
"The Pneumatic Tire", Feb. 2006, available from www.nhtsa.gov, 33 pages.
Brebu, Mihai , et al., "Thermal Degradation of Lignin—A Review", 2010, Cellulose Chem. Technol., 44(9), 353-363.
Brock, F. , et al., "Current Pretreatment Methods for AMS Radiocarbon Dating at the Oxford Radiocarbon Accelerator Unit (ORAU)", Radiocarbon, vol. 52, No. 1, pp. 103-112 (2010).
Chen, Xue , et al., "Effect of hydrothermal pretreatment on the structural changes of alkaline ethanol lignin from wheat straw", 2016, Scientific Reports 6:39354, DOI:1 0.1 038/srep39354, 1-9.
Chen, Xue , et al., "Effect of hydrothermal pretreatment on the structural changes of alkaline ethanol lignin from wheat straw", Scientific Reports, published Dec. 16, 2016, pp. 1-9, Springer Nature.

(56) References Cited

OTHER PUBLICATIONS

Clark, Samuel K., "Mechanics of Pneumatic Tires", 1971, National Bureau of Standards Monograph 122, p. 360.
Czernik, J., et al., "Preparation of Graphite Targets in the Gliwice Radiocarbon Laboratory for AMS 14C Dating", Radiocarbon, vol. 43, No. 2A, pp. 283-291 (2001).
Forrest, M.J., "Rapra Review Reports, Report 139, Rubber Analysis—Polymers, Compounds and Products", 158 pages, vol. 12 issue No. 7.
Guy, L., et al., "New Insights in the Dynamic Properties of Precipitated Silica Filled Rubber Using a New High Surface Silica", Raw Materials and Applications, 2009 particular relevance: pp. 383-384.
Hofmann, W., "Rubber Technology Handbook", Dusseldorf, Spring, pp. 3 (1980).
Jiang, Guozhan, et al., "Effect of the temperature of the composition of lignin pyrolysis products", Energy Fuels, 2010, 24, 4470-4475.
Kaewsakul, W., et al., "Optimization of Rubber Formulation for Silicareinforced Natural Rubber Compounds", Rubber Chemistry and Technology, vol. 86, No. 2, 2013, 17 pages.
Konecny, P., et al., "Dynamic mechanical properties of filled styrene butadiene rubber compounds: comparison of tensile and shear data", Polym. Adv. Technol, 2007: 18:122-127.
Kostial, P., et al., "The Chosen Aspects of Materials and Construction Influence on the Tire Safety in: Composites and Their Properties", Aug. 22, 2012 (DOI: 10.5772/48181), 34 pages.
Leister, G., "Fahrzeugrader-Fahrzeugreifen", 2nd Ed., 2015, 175 pages.
Limper, Andreas, "Mixing of Rubber Compounds", Carl Hanser Verlag, 2011 particular relevance: pp. 71-72.
Popa, V. I., et al., "Nanoparticles based on modified lignins with biocide properties", Cellulose Chemistry and Technology, vol. 45, Issue 3-4, pp. 221-226 (2011).
Ramsey, C.B., "Bayesian Analysis of Radiocarbon Dates", Radiocarbon, vol. 51, No. 1,pp. 337-360 (2009).
Ramsey, C.B., "Development of the Radiocarbon Calibration Program", Radiocarbon, vol. 43, No. 2A, pp. 355-363 (2003).
Ramsey, C.B., et al., "Recent and Planned Developments of the Program OxCal", Radiocarbon, vol. 55, Issue 2, pp. 720-730 (2013).
Reimer, P.J., et al., "Intcal 13 and Marine13 Radiocarbon Age Calibration Curves 0-50,000 Years Cal BP", Radiocarbon, vol. 55, No. 4, pp. 1869-1887 (2013).
Roethemeyer, F., et al., "Rubber technology. Materials—Processing—Products", 3rd ed. Carl Hanser Verlag, pp. 1 (2013) (Abstract Only).
Ross, Kelly, et al., "Comparative analysis of pyrolysis products from a variety of herbaceous, Canadian crop residues", Wood Journal of Agricultural Sciences, 2011, 7(6), 763-776.
Bazanov, Yu. N., et al., "Thermochemistry of Lignin", Russian J. of Appl. Chemistry, 2010, vol. 83, No. 2, 175-194.
Stuiver, M., et al., "Discussion. Reporting of 14 C Data", Radiocarbon, vol. 19, No. 3, pp. 355-363 (1977).
Teh, Swe Jyan, et al., "ZnCl2/NaCl-Catalysed Hydrothermal Carbonization of Glucose and Oil Palm Shell Fiber", Nanoscience and Nanotechnology Letters vol. 7, 611-615, 2015.
Wikberg, Hanne, et al., "Structural and morphological changes in Kraft lignin during hydrothermal carbonization", 2015, ACS Sustainable Chem. Eng.,3, 2737-2745.
Zhang, Bo, et al., "Reaction Kinetics of the Hydrothermal Treatment of Lignin", Appl. Biochem. Biotechnol., Mar. 2008, v. 147, pp. 119-131.
Zhao, J., et al., "Thermal degradation of softwood lignin and hardwood lignin by TGFTIR and Py-GC/MS", Polymer Degradation and Stability, 2014, 108, 133-138.
Shimin Kang et al, "-Xylose, and Wood Meal", Industrial & Engineering Chemistry Research, Band 51, Nr. 26, Jul. 4, 2012 (Jul. 4, 2012), Seite 9023-9031.

\* cited by examiner

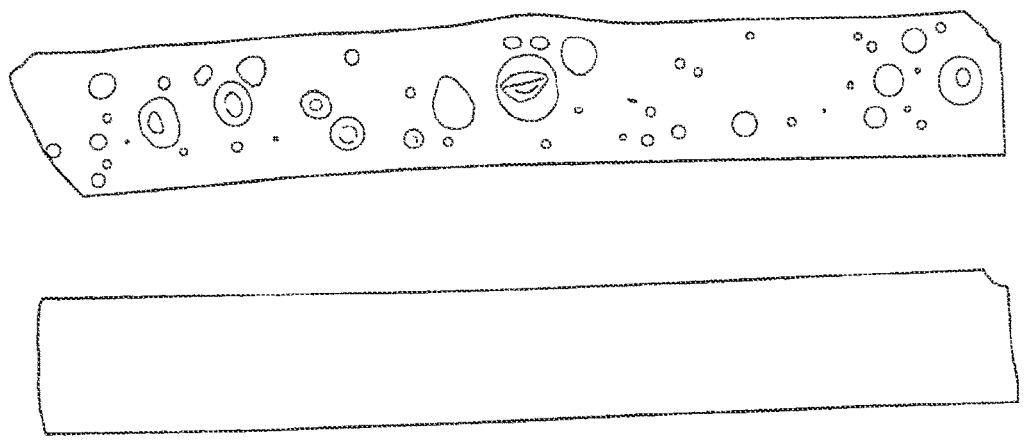
Figure 3 (above, produced with material A; below, produced with material B
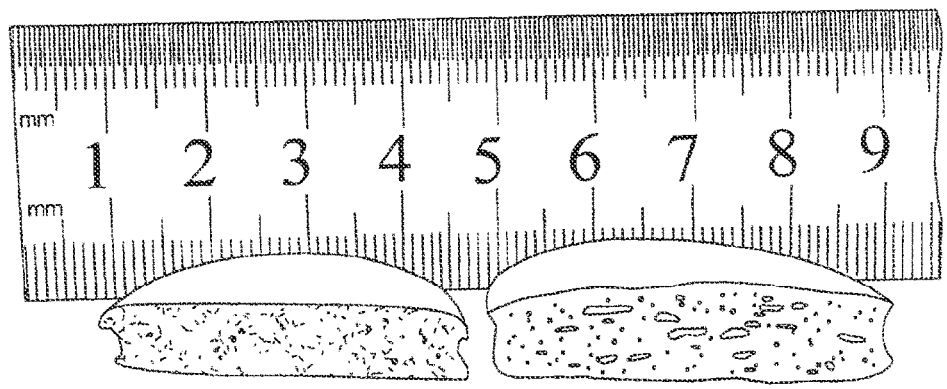
Figure 4 (on the right, produced with material A; on the left, produced with material B)

METHOD FOR ODOR REDUCTION OF PARTICULATE CARBON MATERIALS

CROSS-REFERENCE TO A RELATED APPLICATION

This application is a National Phase Patent Application of International Patent Application Number PCT/EP2020/054636, filed on Feb. 21, 2020, which claims priority of German Patent Application Number 10 2019 104 406.5, filed on Feb. 21, 2019.

BACKGROUND

The proposed solution relates to a method for reducing the odor of particulate carbon materials and to the materials obtained thereby.

Particulate carbon materials are used in many fields of application. These range from use as a black dye to use as a filler in polymers, for example elastomers, thermoplastics or thermoplastic elastomers. Such carbon-based materials can be, for example, carbon black, materials with a relatively high carbon content. Other particulate carbon materials are obtained from renewable raw materials. Such particulate carbon materials have a slightly lower carbon content compared to carbon black, but show interesting properties due to a high degree of functionalization. Particularly interesting starting materials for the production of particulate carbon materials based on renewable raw materials are starting materials that can be wholly or partly dissolved, for example sugar, starch or lignin. Such wholly or partly dissolved starting materials based on renewable raw materials can be converted into particulate carbon materials by precipitation processes. Precipitation processes for the production of particulate carbon materials in solution are sufficiently known to the skilled person.

For example, a lignin-based particulate carbon material can be obtained from lignin dissolved in a base, such as sodium hydroxide solution, by precipitation through introduction of an acid gas such as $CO_2$ or $H_2S$ or by addition of an acid $H_2SO_4$. Examples of this prior art are provided in WO 2006/031175, WO 2006/038863 or WO 2009/104995.

Furthermore, a lignin-based particulate carbon material can be obtained from lignin dissolved in a base, for example sodium hydroxide solution, by increasing the temperature to, for example, hydrothermal carbonization conditions by precipitation with simultaneous stabilization. Examples of this prior art are described in WO 2016/020383 or WO 2017/085278.

Methods for precipitation by introduction of an acid gas, by addition of an acid or by temperature increase can also be combined.

In the production of particulate carbon materials, the adaptation of certain process parameters opens up the possibility of influencing in particular the grain sizes to be obtained (i.e. the size of the agglomerates to be obtained, which are composed of primary particles), as well as the setting of surface parameters, in particular the specific surface area, which is also used as a measure of the primary particle size. The same can be quantified, for example, by methods of determining the surface area, such as BET determinations or statistical thickness surface area (STSA) determinations. In this case, a BET measurement determines the sum of the outer and inner surfaces, while an STSA determination merely determines the outer surface. Suitable determination methods are indicated, for example, in ASTM D 6556-14.

It is known that the average size of the primary particles or the height of the specific surface area has an influence on the properties of the materials produced by using the particulate carbon materials, for example of rubber articles produced by compounding the particulate carbon material with elastomers followed by crosslinking. For example, the abrasion behavior of a rubber article is different depending on whether particulate carbon materials with higher or lower BET surface areas are used. The situation is similar for mechanical properties such as the tensile strength. Higher values for the BET surface area correlate with higher tensile strength values and lower abrasion. Here, when using particulate carbon materials, values for the specific surface area of at least 5 $m^2/g$, preferably at least 8 $m^2/g$, more preferably at least 10 $m^2/g$, moreover preferably at least 15 $m^2/g$ or more are often required to obtain high-quality rubber articles.

However, a disadvantage of the known particulate carbon materials obtained, for example, by precipitation of wholly or partly dissolved starting materials based on renewable raw materials, in particular of lignin-based particulate carbon materials, is the unpleasant odor which emanates from the particulate carbon material per se, is released during the processing of the particulate carbon material, and/or emanates from the materials containing the particulate carbon material. This severely limits the potential applications of the particulate carbon materials, which as such are highly interesting.

Methods for odor reduction of lignin-based particulate carbon materials are known in the prior art. These rely on the one hand on the pre-purification of lignin, for example by extraction methods (WO 2013/101397), enzymatically catalyzed reactions (DE 10 2006 057566), treatment with oxidizing components followed by washing (DE 10 1013 001678), and on the other hand on the treatment of, for example, black liquor, by evaporation processes, treatment with reducing agents or oxidizing agents or also chlorination reactions as well as high-temperature treatments. However, such methods require a treatment of relatively large quantities of material or require the use of chemicals, which is disadvantageous in terms of both the amount of equipment and the financial expenditure.

Hence, it would be desirable to be able to provide a method that permits a targeted reduction of the odor emanating from the particulate carbon material as such, released during the processing of the particulate carbon material and/or emanating from the materials containing the particulate carbon material without the use of further process chemicals, preferably by treatment of the particulate carbon material already obtained. In this way, costs and the amount of equipment can be reduced, while at the same time the amount of material to be processed is lower. However, another requirement for such a method is that the desired properties of the particulate carbon material, such as the specific surface area, are not lost during the odor reduction treatment.

Moreover, the material loss should not be too high since the particulate carbon material already is a valuable product.

SUMMARY

Hence, it is the object underlying the proposed solution to indicate such a method in order to provide the particulate carbon materials described above.

This object is achieved by a method with features as described herein and a product with features as described herein.

BRIEF DESCRIPTION OF THE DRAWINGS

FIG. 3 and FIG. 4 show pictures of the surface quality of elastomer compounds vulcanized without pressure, made with a particulate carbon material, before and after performing the method of the solution.

DETAILED DESCRIPTION

Figure 1:
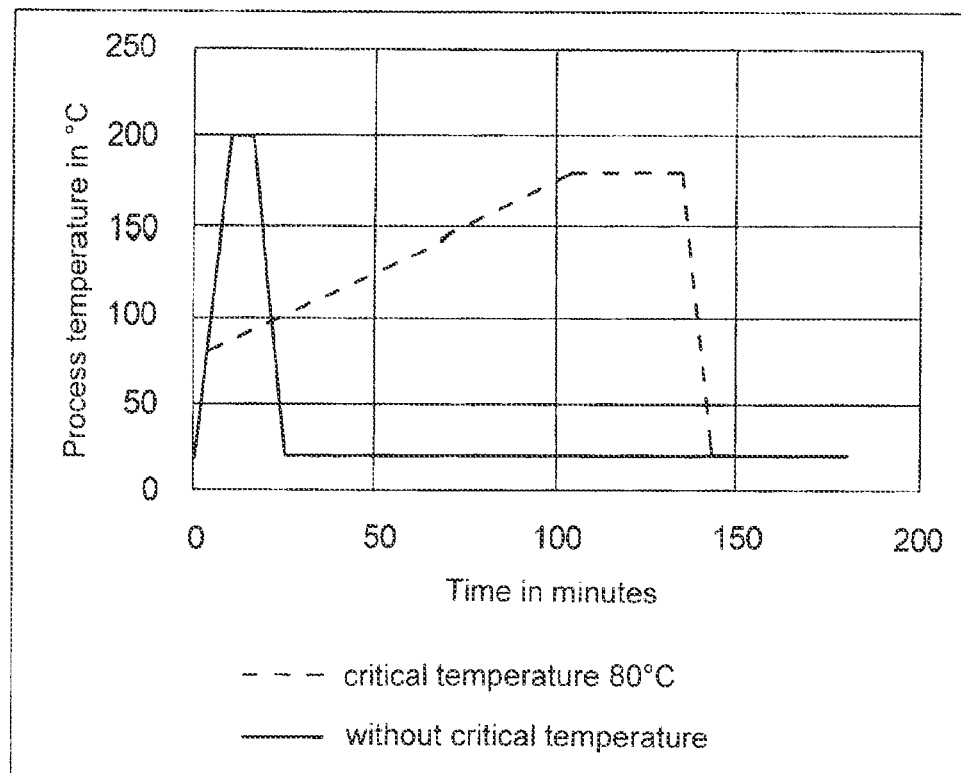
FIG. 1 schematically shows a possible temperature profile for an example of a method according to the proposed solution.
Figure 2:
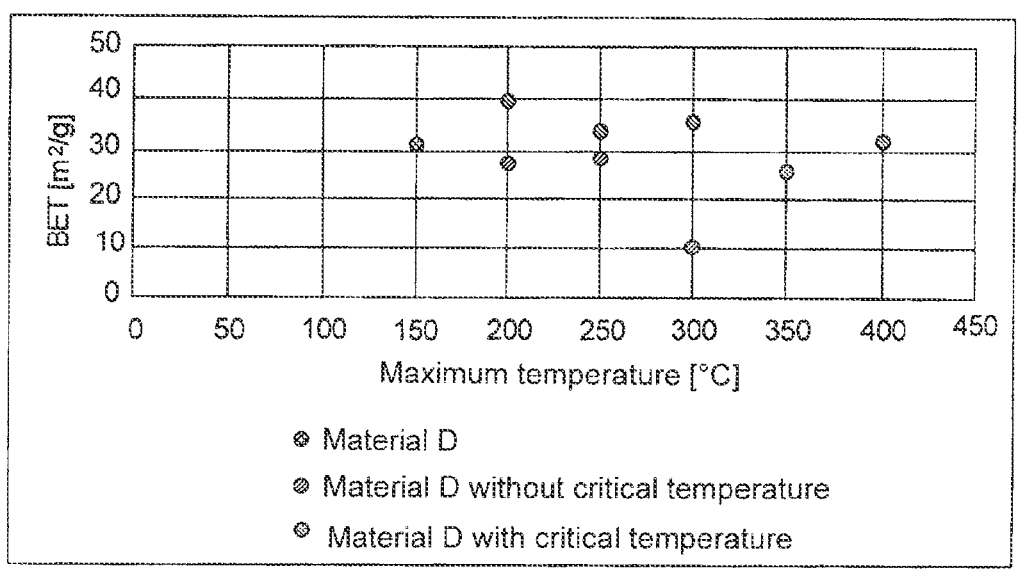
FIG. 2 shows BET surface areas of the starting materials and thermally treated particulate carbon materials of the solution in dependence on the maximum temperature that is reached during the treatment.

The method of the solution allows easy odor reduction of particulate carbon materials produced from starting materials that are based on renewable raw materials.

For example, it is characteristic of the method according to the solution that in a first process step a particulate carbon material (hereinafter pKM) is obtained, the odor of which is reduced in a second process step, whereby the odor-reduced pKM is obtained. This pKM can be, for example, a precipitated lignin, but pKMs, in particular lignin-based ones, which have additionally been subjected to hydrothermal carbonization are preferred.

Preferably, all or part of the starting material can be dissolved in a liquid. More preferably, the starting material consists of more than 50% sugars, starches or lignin.

Preferred embodiments of the first process step will be described below. It is not relevant in the context of the solution whether this first process step is carried out directly before the second process step or whether this first step is carried out significantly ahead of the second in terms of time (so that, for example, the pKM from the first step is produced separately and then stored before being subjected to the second step).

Preferably, the pKm is obtained in the first process step by precipitation of a wholly or partly dissolved starting material. When the starting material consists of more than 50% lignin, the pKM preferably is obtained by precipitation of lignin wholly or partly dissolved in a liquid by introduction of an acid gas and/or by addition of an acid and/or by precipitation and simultaneous stabilization at hydrothermal carbonization (HTC) conditions.

Such methods are known to the skilled person and described in WO 2006/031175 or WO 2006/038863 or WO 2009/104995 (precipitation) or WO 2016/020383 or WO 2017/085278 (precipitation and simultaneous stabilization).

It has proven to be expedient when after the first process step the pKM has a BET surface area of at least 5 m$^2$/g, preferably at least 8 m$^2$/g, more preferably at least 10 m$^2$/g and moreover preferably at least 15 m$^2$/g or more. Advantageously, the BET surface area is not more than 200 m$^2$/g, preferably not more than 180 m$^2$/g.

Advantageously, the BET surface area of the pKM deviates only by a maximum of 20%, preferably by a maximum of 15%, more preferably by a maximum of 10% from its STSA surface area. Hence, the pKM preferably is not porous.

In addition, the pKM preferably exhibits a carbon content (based on the ash-free dry matter) of 50 to 80% by mass (mass-%), more preferably 60 to less than 80 mass-%. Hence, the pKM is a material that differs from carbon blacks by its carbon content. By preferably producing the pKM by precipitation or precipitation in combination with a stabilization (such as a HTC), the lower carbon content compared to carbon blacks simultaneously ensures that a high content of functional groups are present on the particles. The same can be advantageous for the subsequent use of the pKMs.

Preferred embodiments of the second process step are described further below: According to the solution, the pKM is converted into the odor-reduced pKM in a gas atmosphere in the second process step.

Advantageously, the second process step does not take place under atmospheric air, but under a process atmosphere. Process atmosphere is understood to mean, for example, an air enriched by means of inert gases, which has an oxygen content of less than 15% by volume, preferably of less than 10% by volume, more preferably of less than 5% by volume, particularly preferably of less than 3% by volume, and/or a pressure-reduced air with a pressure of less than 500 mbar, preferably less than 200 mbar, more preferably less than 100 mbar.

Advantageously, the oxygen content of a process atmosphere consisting of air enriched by means of inert gas is at least 0.1% by volume, preferably at least 0.5% by volume, particularly preferably at least 1% by volume.

A suitable inert gas in the sense of the solution is in particular nitrogen, carbon dioxide, superheated steam or gases released from the pKM during the second process step. Although the gas released from the pKM during the second process step also contains, for example, carbon monoxide, hydrogen, etc., it is referred to as inert gas in this document. The pressure can be selected according to possibilities or requirements when using air enriched by means of inert gas as the process atmosphere, as already explained above. In terms of equipment, it is easiest to run the process at ambient pressure or at merely slightly negative pressure or excess pressure, for example at ±10 mbar.

The second process step is preferably controlled (for example by selecting the temperature profile, the maximum temperature, the process atmosphere, optionally by selecting the pressure) such that the mass loss of the pKM in the second process step is less than 20%, preferably less than 15%, more preferably 10% or less. A certain loss of mass is required during the second process step of the method according to the solution in order to reduce the content of odorous substances. This mass loss will usually be at least 1% or more, preferably at least 2% or more, in some cases 5% or more. It thereby is ensured and achieved that not too much material is lost and, on the other hand, the desired odor reduction is achieved. The suitability of the treated pKM for use as a filler, for example in elastomers, can then also be ensured.

Regardless of the selection of the process atmosphere of the second process step, the process temperature in the second process step should exceed a minimum temperature and should not exceed a maximum temperature. The maximum temperature is 300° C., preferably 250° C. or less, more preferably 230° C. or less. The minimum temperature is 150° C., preferably 160° C., more preferably 170° C., in some cases 180° C. The holding time for which the pKM is held in the process atmosphere at the process temperature in the second process step can be chosen over a wide range. Suitable values are 1 second or more and 5 hours or less. Preferably, the holding time is 60 minutes or less, more preferably 30 minutes or less, most preferably 15 minutes or less, in some cases less than 10 minutes.

Preferably, the process temperature of the second process step is chosen such that it is not more than 50° C., preferably not more than 40° C., more preferably not more than 30° C., particularly preferably not more than 20° C., in particular not more than 10° C. above a further processing temperature and/or utilization temperature, but not below the minimum temperature and not above the maximum temperature.

Preferably, the process temperature of the second process step is chosen to be at least 50° C., preferably at least 40° C., more preferably at least 30° C., particularly preferably at least 20° C., in particular at least 10° C. below a further processing temperature and/or utilization temperature. Further processing temperature is meant to be the temperature at which the odor-reduced pKM is further processed into a product when mixed with other materials. When the odor-reduced pKM for example is incorporated into rubber compounds, further processing temperature for example is meant to be the temperature at which the rubber compound is crosslinked, e.g. a temperature between 150° C. and 180° C. when sulfur crosslinking is used.

Utilization temperature is meant to be the temperature at which the product containing the odor-reduced pKM is used. When the odor-reduced pKM for example is used in an EPDM-based product, the utilization temperature is not more than 150° C., for example. When the odor-reduced pKM for example is used in an FKM-based product, the utilization temperature is not more than 250° C., for example.

When the further processing temperature and/or the utilization temperature is below the temperature of the first process step, the process temperature preferably is not above, more preferably below, particularly preferably at least 1° C. below, moreover preferably at least 5° C. below the temperature of the first process step.

In a preferred embodiment, a stabilization of a lignin-based starting material in the first process step is effected at hydrothermal carbonization conditions, and in the second process step the temperature of the stabilization at hydrothermal carbonization conditions preferably is not exceeded, more preferably not reached, particularly preferably fallen short of by at least 1° C., more preferably fallen short of by at least 5° C.

It has proven to be advantageous that in the second process step the pKM is treated under the process atmosphere not only during the holding time, but heating and cooling also is carried out under the process atmosphere.

An essential point to improve the second process step is the combination of heating rate and process temperature. The cooling rate, on the other hand, can be chosen freely. Preferably, heating of the pKM to the process temperature beyond a critical temperature only is effected in a controlled manner. Until the critical temperature is reached, the speed of heating can be chosen freely (i.e. heating can be very fast here, for example). However, from the critical temperature it is important to control the heating rate. It has been shown that disadvantageous effects occur with uncontrolled heating beyond the critical temperature, in particular undesirably high mass loss and large loss of BET surface area. Heating rates of less than 30° C./min from the critical temperature have proven to be particularly advantageous, in particular 20° C./min or less. Preferred ranges for heating rates lie in the range of 1° C./min to 20° C./min, such as 5° C./min to 10° C./min. When the maximum temperature of the treatment is 250° or higher, it has proven to be preferable when the heating rates are particularly low in this temperature range, such as for example 0.1° C./min to 5° C./min.

The critical temperature differs depending on which starting material was converted to a pKM in the first process step and how the first process step is designed. The critical temperature usually lies between 80° C. and 250° C., more preferably between 100° C. and 230° C.

When the pKM was obtained from softwood lignin in the first process step, for example, by precipitation with combined stabilization under hydrothermal carbonization conditions, the critical temperature in the second process step preferably lies between 150° C. and 230° C., more preferably between 180° C. and 220° C.

When the pKM in the first process step was obtained from hardwood lignin for example by precipitation with combined stabilization under hydrothermal carbonization conditions, the critical temperature in the second process step preferably lies between 130° C. and 200° C., more preferably between 140° C. and 180° C.

When the pKM was obtained from softwood lignin in the first process step, for example, by precipitation with combined stabilization under hydrothermal carbonization conditions, a mass loss of merely 10% or less can be achieved with a second process step, for example, at a maximum treatment temperature of 250° C. or less, with a simultaneous loss of BET surface area of about 5 $m^2/g$ or less (i.e., when the pKM has a BET surface area of 40 $m^2/g$, the same drops to a maximum of 35 $m^2/g$). At the same time, odor tests have shown a significant decrease in unpleasant odors. This decrease was found for the odor-reduced pKM as such, during the production of a rubber article that was filled with the odor-reduced pKM, as well as for the rubber article compared to one with a pKM that had not undergone the second process step.

The method according to the solution hence can achieve a good balance between desirable odor minimization and simultaneous extensive preservation of the desired material properties as well as low mass loss. Neither the use of process chemicals nor complex methods are necessary. Also, the maximum temperature of the treatment according to the solution lies in a comparatively low range, which is advantageous both in terms of cost and process control.

Apparatuses used to perform such treatments are well known to the skilled person. Preferably, the second process step is carried out in a rotary kiln or in a fluidized bed. More preferably, the second process step can be combined with grinding or classifying, for example in a gas jet mill, in a turbo rotor mill or in an air classifier.

As already described above, the pKMs obtained according to the solution, preferably based on lignin and preferably obtained by a precipitation or a precipitation with combined stabilization, for example, at hydrothermal carbonization conditions, are also proposed for use in rubber compounds. In the context of the solution, it has been shown that odor-reduced pKMs produced according to the solution in particular are suitable for use in elastomer compounds in which the desired rubber articles are produced by pressureless vulcanization. Here, rubber articles containing pKM produced according to the prior art not only show the odor development during vulcanization and the odor of the obtained vulcanizate, but also an undesirable porosity which significantly reduces the mechanical properties. Here, the method according to the solution allows to overcome this disadvantage. While odor development possibly might be reduced to acceptable levels by storage for a limited period after product manufacture, a product affected by porosity is not acceptable in principle. This can additionally be avoided in the context of the solution.

In the context of the solution, it has also been shown that odor-reduced pKMs produced according to the solution are also modified in terms of polarity or hydrophobicity and are, for example, more compatible for use in hydrophobic or low-polarity elastomer compounds than pKMs produced according to the prior art.

Advantageously, the odor-reduced particulate carbon material is obtained by the method described above. Thus, the solution also provides an odor-reduced pKM, preferably obtained by the method according to the solution.

The odor-reduced pKM differs from prior art materials, for example, in that
it has a BET of at least 5 m²/g,
the odor of a rubber article produced by using 50 phr of odor-reduced pKM is more comparable to the odor of a rubber article produced by using 50 phr of N550 than to the odor of a rubber article produced by using 50 phr of LignoBoost lignin.

Preferably, the odor-reduced pKM has a dimethyl sulfide content of not more than 1 mg/kg, preferably not more than 0.5 mg/kg, more preferably less than 0.1 mg/kg, moreover preferably less than 0.05 mg/kg, in particular less than 0.01 mg/kg.

Preferably, the odor-reduced pKM has a guaiacol content of not more than 0.1 mg/kg, preferably not more than 0.05 mg/kg, more preferably less than 0.01 mg/kg, moreover preferably less than 0.005 mg/kg, in particular less than 0.001 mg/kg.

Preferably, the odor-reduced pKM has a naphthalene content (DIN EN 16181:2017-11/draft) of less than 5 mg/kg. Preferably, the sum of the 18 EPA-PAK excluding BG (DIN EN 16181:2017-11/draft) is less than 5 mg/kg. Preferably, no content (<0.1 mg/kg) of benzo(a)anthracene, chrysene, benzo(b)fluoroanthene, benzo(k)fluoroanthene, benzo(a)pyrene, indenol(1,2,3-cd)pyrene, dibenzol(a,h)anthracene, benzene(ghi)perylene, benzo(e)pyrene and benzo(j)fluoroanthene is detectable (DIN EN 16181:2017-11/draft).

The odor-reduced pKM for example differs from prior art materials in that
it has a BET of at least 5 m²/g and
the porosity of a rubber article produced by pressureless vulcanization by using 50 phr of odor-reduced pKM is more comparable to the porosity of a rubber article produced by pressureless vulcanization by using 50 phr of N550 as compared to the porosity of a rubber article produced by pressureless vulcanization by using 50 phr of LignoBoost lignin.

The odor-reduced pKM for example differs from prior art materials in that
it has a BET of at least 5 m²/g,
has a Klason lignin content of at least 90%, and
the proportions of substances associated with unpleasant odor, for example dimethyl disulfide, measured at 160° C. in HS-GC/MS are reduced to less than 30%, preferably to less than 25%.

Example 1

First Process Step:
A pKM (material A) was obtained from softwood lignin by stabilization at hydrothermal carbonization conditions.
Second Process Step:
10 kg of material A with a BET of 40 m²/g (determined according to ASTM D 6556-14) were treated in a drying cabinet for a period of 3 hours at a temperature of 250° C. The oxygen content in the drying cabinet was reduced to less than 10% by volume during heating, during the holding time and during cooling by rinsing with nitrogen. The heating rate was 1 K/min from a temperature of 150° C. 9.6 kg of odor-reduced pKM (material B) with a BET of 30 m²/g were obtained. Material A and material B were measured in headspace GC/MS at 160° C. The following results were obtained:

|  | Elution time [min] | Peak area Material A | Peak area Material B | From starting value [%] | Change [%] |
|---|---|---|---|---|---|
| Acetone | 1.59 | 1.21 | 3.19 | 263 | 163 |
| Dimethyl sulfide | 1.66 | 0.27 | 0.00 | 0 | −100 |
| Acetic acid methyl ester | 1.69 | 1.51 | 5.50 | 364 | 264 |
| Acetic acid | 2.01-2.26 | 2.21 | 0.35 | 16 | −84 |
| Dimethyl disulfide | 3.80-3.82 | 3.99 | 0.11 | 3 | −97 |
| Phenol | 11.47 | 1.63 | 0.11 | 7 | −93 |
| 2-Methoxyphenol (Guaiacol) | 14.88-14.98 | 48.93 | 10.62 | 22 | −78 |
| 1,2-Dimethoxybenzene (Veratrol) | 16.7 | 4.45 | 1.20 | 27 | −73 |
| 2-Methoxy-4-methylphenol | 18.05 | 1.61 | 0.41 | 26 | −74 |
| 4-Ethyl-2-methoxyphenol (4-Ethylguaiacol) | 20.52 | 4.03 | 0.22 | 5 | −95 |

Materials A and B do not differ significantly in their elemental sulfur contents despite the decrease in sulfur-containing compounds. In the elemental composition, merely the carbon content of material B treated according to the method of the solution is increased. Material B also shows a 9% increase in fixed carbon content.

| Sample name | | Method | Material A | Material B |
|---|---|---|---|---|
| BET | m²/g | ASTM D 6556-14 | 40 | 30 |
| Ash content, wf. | Ma.-% | DIN 51 719 | 3.97 | 4.10 |
| Carbon, wf. | Ma.-% | DIN 51732 | 67.4 | 68.5 |
| Hydrogen, wf. | Ma.-% | DIN 51732 | 5.23 | 5.11 |
| Nitrogen, wf. | Ma.-% | DIN 51732 | 0.14 | 0.10 |
| Sulfur, wf. | Ma.-% | DIN 51724 T3 | 0.80 | 0.81 |
| Volatile components, wf. | Ma.-% | DIN 51 720 | 47.9 | 43.6 |
| Fixed carbon, wf. | Ma.-% | DIN 51 720 | 48.1 | 52.3 |
| Solubility in 0.1M NaOH | Ma.-% | internally | 26 | 10 |
| Solubility in 1M NaOH | Ma.-% | internally | 29 | 2 |
| Grain size d50 | μm | ISO 13320:2009 | 1.92 | 1.84 |

Example 2

Material A (pKM) from Example 1 with a BET of 40 m²/g, material B (odor-reduced pKM) from Example 1 with a BET of 30 m²/g and a third pKM (material C) with a BET of 30 m²/g were blended into an SBR matrix as fillers. After vulcanization, the course of the stress-strain curve was recorded in the tensile test. The tensile strength results are shown in Table y.

| | Tear strength [Mpa] | Elongation at break [%] | σ 50% [Mpa] | σ 100% [Mpa] | σ 200% [Mpa] | σ 300% [Mpa] | σ 500% [Mpa] |
|---|---|---|---|---|---|---|---|
| Material A | 12.8 | 307 | 1.2 | 2.9 | 8.1 | 12.1 | — |
| Material B | 12.9 | 409 | 1.2 | 2.6 | 6.8 | 10.1 | — |
| Material C | 10.2 | 416 | 1.0 | 2.1 | 5.4 | 8.1 | — |

The production of the mixture for the elastomer compounds and the production of the vulcanizates were effected according to the following formulation by means of the following processes:

Formulation:

| Mixture component | Mixing proportion [phr] |
|---|---|
| SSBR 4526/2 | 103 |
| BR (CB24) | 25 |
| pKM/treated pKM | 80 |
| Si 69 | 7 |
| Zinc oxide | 2.5 |
| Stearic acid | 2.5 |
| 6PPD | 2 |
| TMQ | 2 |
| TDAE oil | 5 |
| DPG | 2 |
| TBBS | 1.7 |
| Sulfur | 1.4 |

All indicated quantities are based on 100 parts of rubber (parts per hundred rubber—phr).

The mixture was prepared by the following method:

The mixtures were prepared by means of a Haake Rheomix 3000 measuring kneader (tangential rotor geometry) with a filling level of 70%. The mixing temperature was kept constant via the speed control. The mixing time was about 20 minutes. Vulcanization was carried out at 160° C. according to the optimum t90 time determined in the rheometer plus one minute for each millimeter of plate thickness.

Example 3

Material A (pKM) from Example 1 with a BET of 40 m$^2$/g and material B (odor-reduced pKM) from Example 1 with a BET of 30 m$^2$/g were blended into an EPDM matrix as fillers. After vulcanization, the course of the stress-strain curve was recorded in the tensile test. The results are shown in Table x:

| | Tear strength [Mpa] | Elongation at break [%] | σ 50% [Mpa] | σ 100% [Mpa] | σ 200% [Mpa] | σ 300% [Mpa] | σ 500% [Mpa] |
|---|---|---|---|---|---|---|---|
| Material A | 8.1 | 677 | 1.2 | 2.0 | 3.7 | 4.6 | 6.0 |
| Material B | 7.3 | 626 | 1.4 | 2.3 | 4.2 | 5.1 | 6.2 |

Formulation

| Mixture component | Mixing proportion [phr] |
|---|---|
| Keltan 8550C | 100.0 |
| Zinc oxide | 5.0 |
| Stearic acid | 1.0 |
| Sunpar 2280 | 60.0 |
| pKM/treated pKM | 140.0 |
| PEG 4000 | 2.0 |
| Sulfur | 1.5 |
| TMTM 80 | 1.9 |
| MBTS | 0.9 |
| ZDBC 80 | 3.7 |

The mixtures were prepared by the following method:

The mixtures were prepared using a W & P Type GK1.5E mixer (intermeshing rotor geometry) with a filling level of 70%, with a mixer temperature of 40° C. and a speed of 40 rpm. Vulcanization was carried out by baking at 160° C. according to the optimum t90 time determined in the rheometer.

For pressureless vulcanization, 2 test specimens per mixture variant were produced from a 6 mm thick compound skin by means of a volume die cutter and vulcanized for 30 minutes at 160° C. in a heating cabinet. After collection, one specimen was immediately cut open and assessed for odor and porosity, and the second was cut open and assessed after cooling to room temperature.

Since in pressureless vulcanization in production the material generally undergoes an extrusion process in which it is exposed to a pressure in the die that largely removes contained air, it can be assumed that the porosity in real production is even lower than determined in this laboratory method.

The rubber article produced using material A had the following porosity:

The rubber article produced using material B had the following porosity:

Example 4

First Process Step:

A pKM (material D) was obtained from softwood lignin by stabilization at hydrothermal carbonization conditions.

Second Process Step:

Material D with a BET of 31.1 m²/g was subjected to the method according to the solution at different temperatures. Nitrogen was chosen as the process atmosphere. Material D was treated at the treatment temperatures indicated in the table. Heating was effected either without control of the heating rate (spontaneous) or with a heating rate of 10 Kelvin/10 minutes from a critical temperature of 150° C. (from 150 10K/10 MIN). Furthermore, the BET of the odor-reduced pKM is indicated.

| Treatment temperature | Temperature increase | BET | Change in BET | |
|---|---|---|---|---|
| ° C. | K/MIN | m²/g | [%] | [m²] |
| 200 | spontaneously | 27.3 | 88 | −4 |
| 250 | spontaneously | 31.1 | 100 | 0 |
| 300 | spontaneously | 10.3 | 33 | −21 |
| 200 | from 150 10K/10 MIN | 39.6 | 127 | 8 |
| 250 | from 150 10K/10 MIN | 33.8 | 109 | 3 |
| 300 | from 150 10K/10 MIN | 35.7 | 115 | 5 |
| 350 | from 150 10K/10 MIN | 25.6 | 82 | −6 |
| 400 | from 150 10K/10 MIN | 31.9 | 103 | 1 |

This example shows that a temperature increase without control of the heating rate can be effected up to a treatment temperature of 200° C. without significantly influencing the BET.

This example furthermore shows that a temperature increase with control of the heating rate can be performed from a critical temperature of 150° C. up to a temperature of 400° C. without significantly influencing the BET.

The invention claimed is:

1. A method for producing an odor-reduced particulate carbon material, the method comprising:
   in a first process step precipitating a starting material wholly or partly dissolved in a liquid to obtain a particulate carbon material,
   treating the particulate carbon material subsequently in a second process step by heating in a gas atmosphere and a process temperature, whereby the odor-reduced particulate carbon material is produced,
   wherein in the second process step the process temperature does not exceed a maximum temperature of 300° C. and does not fall below a minimum temperature of 150° C. and
   wherein the gas atmosphere in the second process step is selected from:
   (a) an enriched air comprising one or more inert gases, which has an oxygen content of less than 15% by volume, and/or
   (b) a pressure-reduced air with a pressure of less than 500 mbar.

2. The method according to claim 1, wherein the oxygen content of the enriched air is at least 0.1% by volume.

3. The method according to claim 1, wherein the starting material comprises more than 50% lignin, and the precipitating of the starting material is effected by introduction of an acid gas and/or by addition of an acid.

4. The method according to claim 1, wherein the starting material comprises more than 50% lignin, and the process further comprises stabilizing the starting material, which is effected at hydrothermal carbonization conditions.

5. The method according to claim 1, wherein the particulate carbon material has a BET of at least 5 m²/g and not more than 200 m²/g after the precipitating of the starting material.

6. The method according to claim 1, wherein a duration for holding the particulate carbon material at the process temperature in the gas atmosphere is more than 1 second and less than 60 minutes.

7. The method according to claim 1 wherein the treating of the particulate carbon material further comprises heating and cooling under the gas atmosphere.

8. The method according to claim 1, wherein the treating of the particulate carbon material is carried out in a rotary kiln or in a fluidized bed.

9. The method according to claim 1, wherein the treating of the particulate carbon material is combined with grinding or classifying.

10. The method according to claim 1, wherein the starting material comprises more than 50% sugars, starches, or lignin.

11. The method according to claim 1, wherein: the oxygen content of enriched air is less than 10% by volume, and/or the one or more inert gases are selected from the group consisting of: nitrogen, carbon dioxide, superheated steam, and gases released during the treating of the particulate carbon material.

12. The method according to claim 1, wherein the first process step is conducted by hydrothermal carbonization (HTC).

* * * * *